United States Patent
Sun et al.

(10) Patent No.: US 11,662,002 B2
(45) Date of Patent: May 30, 2023

(54) TWO-DEGREE-OF-FREEDOM DECOUPLED TRANSMISSION APPARATUS FOR SPATIAL ADHESION PAWL

(71) Applicant: SHANGHAI AEROSPACE CONTROL TECHNOLOGY INSTITUTE, Shanghai (CN)

(72) Inventors: Jun Sun, Shanghai (CN); Jinhai Wang, Shanghai (CN); Xiaolong Zhang, Shanghai (CN); Ting Song, Shanghai (CN); Zhigang Liu, Shanghai (CN)

(73) Assignee: SHANGHAI AEROSPACE CONTROL TECHNOLOGY INSTITUTE, Shanghai (CN)

( * ) Notice: Subject to any disclaimer, the term of this patent is extended or adjusted under 35 U.S.C. 154(b) by 160 days.

(21) Appl. No.: 17/416,429

(22) PCT Filed: Feb. 14, 2020

(86) PCT No.: PCT/CN2020/075168
§ 371 (c)(1),
(2) Date: Jun. 18, 2021

(87) PCT Pub. No.: WO2020/125815
PCT Pub. Date: Jun. 25, 2020

(65) Prior Publication Data
US 2022/0074471 A1    Mar. 10, 2022

(30) Foreign Application Priority Data
Dec. 18, 2018    (CN) .......................... 201811547726.1

(51) Int. Cl.
*F16H 25/04*    (2006.01)
*F16H 53/00*    (2006.01)

(52) U.S. Cl.
CPC ............. *F16H 25/04* (2013.01); *F16H 53/00* (2013.01)

(58) Field of Classification Search
CPC ................................ F16H 25/04; F16H 53/00
See application file for complete search history.

(56) References Cited

U.S. PATENT DOCUMENTS 2,297,090 A * 9/1942 Weaver ................... F16H 53/00
74/567
2007/0094847 A1    5/2007 Thomson
(Continued)

FOREIGN PATENT DOCUMENTS

CN    102390548 A    3/2012
CN    103921960 A    7/2014
(Continued)

*Primary Examiner* — Terence Boes
(74) *Attorney, Agent, or Firm* — Bayramoglu Law Offices LLC

(57) ABSTRACT

A two-degree-of-freedom decoupled transmission apparatus for a spatial adhesion pawl mainly includes a tangential loading transmission mechanism and a normal de-adhesion transmission mechanism. The tangential loading transmission mechanism adopts a bevel gear pair, such that the tangential loading transmission mechanism is arranged in a bending manner, and a tangential loading motor of the tangential loading transmission mechanism is collected inside the apparatus. The tangential loading motor is connected to a cam pull plate through the bevel gear pair, a worm gear reducer and a key, and drive the cam pull plate to rotate around a central shaft of an adhesion apparatus. Six transmission bolts on six adhesion units are respectively driven through six cam grooves on the cam pull plate to simultaneously perform centripetal driving on the adhesion units with a further increased force, so as to realize tangential and centripetal loading of the adhesion units.

13 Claims, 4 Drawing Sheets

(56) References Cited

U.S. PATENT DOCUMENTS

| | | | | |
|---|---|---|---|---|
| 2014/0260721 A1* | 9/2014 | Hoefken | ............... | F16H 29/12 |
| | | | | 74/55 |
| 2018/0080532 A1* | 3/2018 | Oster | ............... | F16H 25/04 |
| 2019/0184441 A1* | 6/2019 | Dole | ............... | F16H 25/04 |
| 2021/0040853 A1* | 2/2021 | Zaitsev | ............... | F01C 17/02 |

FOREIGN PATENT DOCUMENTS

| | | | |
|---|---|---|---|
| CN | 105599004 A | | 5/2016 |
| CN | 107792346 A | | 3/2018 |
| CN | 109760858 A | | 5/2019 |

\* cited by examiner

TWO-DEGREE-OF-FREEDOM DECOUPLED TRANSMISSION APPARATUS FOR SPATIAL ADHESION PAWL

CROSS REFERENCE TO THE RELATED APPLICATIONS

This application is the national phase entry of International Application No. PCT/CN2020/075168, filed on Feb. 14, 2020, which is based upon and claims priority to Chinese Patent Application No. 201811547726.1, filed on Dec. 18, 2018, the entire contents of which are incorporated herein by reference.

TECHNICAL FIELD

The present invention relates to a two-degree-of-freedom decoupled transmission apparatus for a spatial adhesion pawl.

BACKGROUND

In and out the aerospace industry, most of the existing two-shaft transmission systems adopt an arrangement mode of superimposing the two shafts. The two degrees of freedom thereof are decoupled. However, the existing two-shaft transmission systems do not perform an embedded fusion design on a two-degree-of-freedom transmission structure, and do not perform a large number of one-piece multi-purpose designs, thereby having a great number of components, a large structural size, a great weight, and a high manufacturing cost. The existing transmission systems have low reliability and high launch cost, and obviously are not suitable for space application scenarios. At present, a spatial adhesion apparatus adopting a dry adhesive material only has one rope transmission mode, but has no transmission system adopting a rigid transmission.

SUMMARY

The objective of the present invention is to provide a two-degree-of-freedom decoupled transmission apparatus for a spatial adhesion pawl.

In order to solve the above problem, the present invention provides a two-degree-of-freedom decoupled transmission apparatus for a spatial adhesion pawl, including a tangential loading transmission mechanism and a normal de-adhesion transmission mechanism, wherein the tangential loading transmission mechanism is used to realize centripetal loading and centrifugal unloading transmission functions; the tangential loading transmission mechanism adopts a bevel gear pair, such that the tangential loading transmission mechanism is arranged in a bending manner, and a motor of the tangential loading transmission mechanism is collected inside the apparatus; the tangential loading motor of the tangential loading transmission mechanism is connected to a cam pull plate by means of the bevel gear pair, a worm gear reducer and a key, and drives the cam pull plate to rotate around a central shaft of an adhesion apparatus; then, six transmission bolts on six adhesion units are respectively driven by means of six cam grooves on the cam pull plate to simultaneously perform centripetal driving on the adhesion units with a further increased force, so as to realize tangential and centripetal loading of the adhesion units;

the normal de-adhesion transmission mechanism adopts a two-stage force increasing mechanism consisting of a trapezoidal lead screw and a four-rod force increasing mechanism which is located at a dead point position during reverse; the lead screw is suspended in the middle of the four-rod force increasing mechanism with the aid of two hinges at across corners of the four-rod force increasing mechanism; and an output rod of the two-stage force increasing mechanism pulls a combination in the apparatus in the axial direction of the central shaft of the adhesion apparatus, drives the cam pull plate thereon and then pulls the six transmission bolts, and finally drives the six adhesion units to simultaneously de-adhere and bend backward or do a return motion.

Further, in the two-degree-of-freedom decoupled transmission apparatus for a spatial adhesion pawl, the output rod of the two-stage force increasing mechanism is located between a worm gear and the cam pull plate; the output rod of the two-stage force increasing mechanism, the worm gear and the cam pull plate form a triplet, and are cylindrically connected by means of a central hole of the cam pull plate and the central shaft of the adhesion apparatus; and the cam pull plate can move and rotate along/around an axis of the central shaft of the adhesion apparatus.

Further, in the two-degree-of-freedom decoupled transmission apparatus for a spatial adhesion pawl, the transmission apparatus further includes a thin nut disposed at an end of the cam pull plate; the thin nut at an end of the cam pull plate is used to limit the relative movement of the triplet in a common axial direction thereof; and the thin nut is firmly adhered to an external thread at the end of the cam pull plate by means of a thread bonding agent.

Further, in the two-degree-of-freedom decoupled transmission apparatus for a spatial adhesion pawl, the output rod of the two-stage force increasing mechanism is sleeved on a shaft neck of the cam pull plate in a clearance fit manner, such that the two can freely and relatively rotate.

Further, in the two-degree-of-freedom decoupled transmission apparatus for a spatial adhesion pawl, the transmission apparatus further includes a worm gear; the worm gear is circumferentially and fixedly connected to the cam pull plate by means of an A type key at a proximal end of a shaft neck of the cam pull plate.

Further, in the two-degree-of-freedom decoupled transmission apparatus for a spatial adhesion pawl, two auxiliary support plates are disposed on a motor mounting plate of a normal de-adhesion drive motor; the two auxiliary support plates both have a 0.5 mm distance to the normal de-adhesion drive motor; a threaded hole is drilled on each of the two auxiliary support plates; a fastening screw is tightened on each of the two auxiliary support plates on different sides of the normal de-adhesion drive motor until the screws contact the normal de-adhesion drive motor; at an intermediate section of the normal de-adhesion drive motor, steel wires bind the normal de-adhesion drive motor 3 on the auxiliary support plates by means of wire-through holes of the auxiliary support plates; the steel wires are knotted with an aluminum-made plastic chuck.

Further, in the two-degree-of-freedom decoupled transmission apparatus for a spatial adhesion pawl, the cam pull plate is made from aluminum bronze.

Further, in the two-degree-of-freedom decoupled transmission apparatus for a spatial adhesion pawl, a circular arc through hole having a radial distance to a connection screw is disposed on the cam pull plate; and a central angle of the circular arc through hole is greater than a rotation angle of the cam pull plate during tangential loading and unloading.

Further, in the two-degree-of-freedom decoupled transmission apparatus for the spatial adhesion pawl, at an intermediate section of the tangential loading motor, steel wires are used to bind the tangential loading motor on a mounting bottom plate, and the steel wires are knotted with an aluminum-made plastic chuck.

Further, in the two-degree-of-freedom decoupled transmission apparatus for the spatial adhesion pawl, the worm gear is in a form of an incomplete worm gear.

Further, in the two-degree-of-freedom decoupled transmission apparatus for the spatial adhesion pawl, a guide shaft and a bushing cooperate to circumferentially limit a worm screw assembly on a tangential loading and unloading transmission mechanism and a drive motor of the tangential loading and unloading transmission mechanism. The worm screw assembly and the drive motor are allowed to move along an axis of the central shaft of the adhesion apparatus together with the cam pull plate which is also located on the normal de-adhesion transmission mechanism.

Further, in the two-degree-of-freedom decoupled transmission apparatus for the spatial adhesion pawl, the two-degree-of-freedom decoupled transmission apparatus for the spatial adhesion pawl realizes centripetal loading and unloading motions for de-adhering, backward bending and decoupling the six adhesion units at any de-adhesion and backward bending positions of the six adhesion units.

Further, in the two-degree-of-freedom decoupled transmission apparatus for the spatial adhesion pawl, centripetal loading and unloading motions of the six adhesion units and de-adhesion, bending backward, and return motions of the six adhesion units form four combined motions.

Compared with the prior art, the present invention mainly includes a tangential loading transmission mechanism and a normal de-adhesion transmission mechanism. The apparatus is used to drive a spatial adhesion unit to adhere or de-adhere to a target. The advantages thereof are: first, the present invention can satisfy a transmission requirement for centripetal loading and centrifugal unloading in a tangential direction of an adhesive surface when the spatial adhesion unit adheres to the target; second, the present invention can satisfy a transmission requirement for loading a de-adhesive force in a normal direction of the adhesive surface when the spatial adhesion unit de-adheres to the target; third, the present invention can realize a decoupling motion of loading and unloading in the tangential direction of the adhesive surface and loading the de-adhesive force in the normal direction of the adhesive surface, thereby facilitating the design of a motion control system; and fourth, the transmission apparatus can adapt to a complex space and a harsh environment, adopts the design concept of high reliability and compact structure, takes a plurality of reliable measures such as multi-purpose component, resistance to complex space and harsh environment, and excellently realizes a predetermined use objective.

DETAILED DESCRIPTION OF THE EMBODIMENTS

Figure 1:
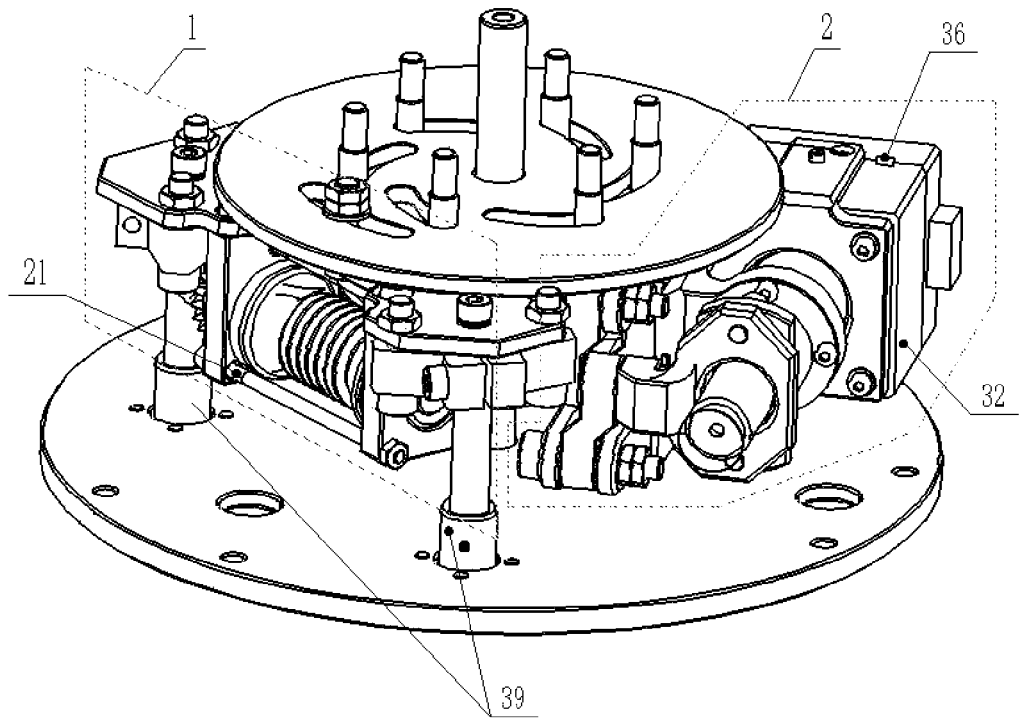
FIG. 1 is an overall view of a two-degree-of-freedom decoupled transmission apparatus for a spatial adhesion pawl according to an embodiment of the present invention.
Figure 2:
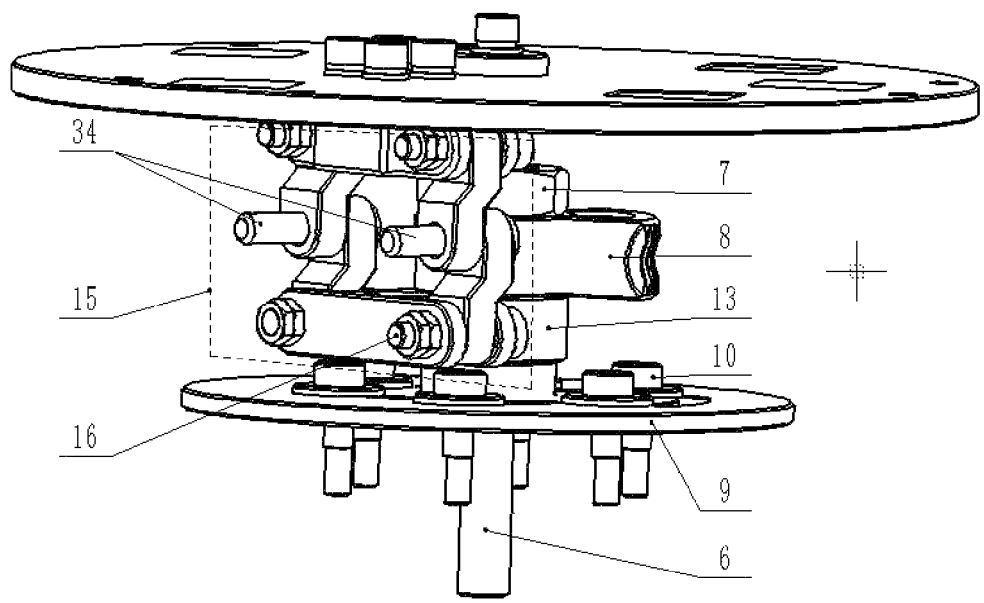
FIG. 2 is a view of a four-rod force increasing mechanism of a normal de-adhesion transmission mechanism 2 according to an embodiment of the present invention.
Figure 3:
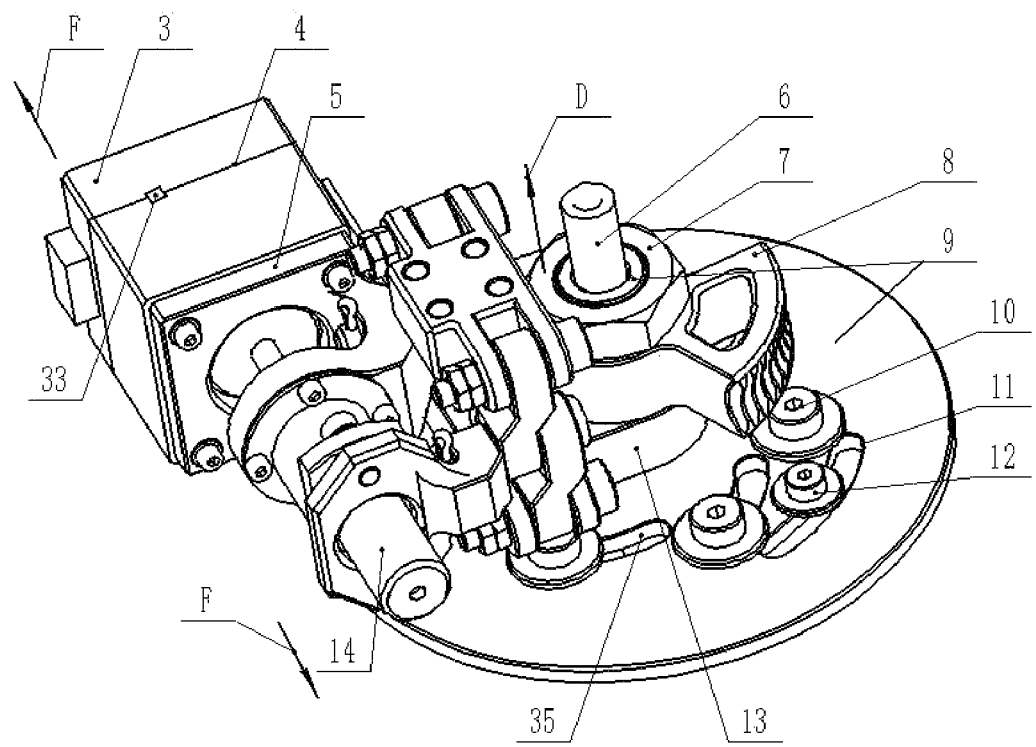
FIG. 3 is an overall view of the normal de-adhesion transmission mechanism 2 according to an embodiment of the present invention.

To enable the above objective, features and advantages of the present invention to be more apparent and easily understood, the present invention will be further described in detail hereafter with reference to the accompanying drawings and specific embodiments.

As shown in FIGS. 1-7, the present invention provides a two-degree-of-freedom decoupled transmission apparatus for a spatial adhesion pawl, including the tangential loading transmission mechanism 1 and the normal de-adhesion transmission mechanism 2. The tangential loading transmission mechanism 1 is used to realize centripetal loading and centrifugal unloading transmission functions.

The normal de-adhesion transmission mechanism 2 adopts a two-stage force increasing mechanism to load a de-adhesive force. The two-stage force increasing mechanism consists of the trapezoidal lead screw 14 and the four-rod force increasing mechanism which is symmetrical and located at a dead point position during reverse loading. The trapezoidal lead screw 14 is a self-locking trapezoidal lead screw, and is located at a dead point position during the reverse loading of the four-rod force increasing mechanism.

The two-stage force increasing mechanism and the normal de-adhesion drive motor 3 are suspended at the middle of the four-rod force increasing mechanism through two hinges 34 at across corners of the four-rod force increasing mechanism.

The normal de-adhesion drive motor 3 of the normal de-adhesion transmission mechanism 2 is directly connected to the trapezoidal lead screw 14 driven thereby, thereby saving a shaft coupling. In order to facilitate installation, the trapezoidal lead screw 14 is first assembled; then the position of the normal de-adhesion drive motor 3 is adjusted; and a motor mounting hole is enlarged by 0.5 mm.

In an embodiment of the present invention, the output rod 13 of the two-stage force increasing mechanism is located between the worm gear 8 and the cam pull plate 9. The output rod 13 of the two-stage force increasing mechanism, the worm gear 8 and the cam pull plate 9 form a triplet, and are cylindrically fitted through a central hole of the cam pull plate 9 and the central shaft 6 of an adhesion apparatus. The cam pull plate 9 can move along and rotate around an axis of the central shaft 6 of the adhesion apparatus.

In an embodiment of the present invention, the two-degree-of-freedom decoupled transmission apparatus further includes the thin nut 7 disposed at an end of the cam pull plate 9. The thin nut 7 at the end of the cam pull plate 9 is used to limit the relative movement of the triplet in a common axial direction thereof. The thin nut 7 is firmly adhered to an external thread at the end of the cam pull plate 9 through a thread bonding agent.

In an embodiment of the present invention, the output rod 13 of the two-stage force increasing mechanism is sleeved on a shaft neck of the cam pull plate 9 in a clearance (which is greater than a preset threshold value) fit manner, such that the two can freely and relatively rotate.

In an embodiment of the present invention, the two-degree-of-freedom decoupled transmission apparatus further includes the worm gear 8. The worm gear 8 is circumferentially and fixedly connected to the cam pull plate 9 through the A-type key 28 at a proximal end of a shaft neck of the cam pull plate 9.

In an embodiment of the present invention, two auxiliary support plates are disposed on the motor mounting plate 5 of the normal de-adhesion drive motor 3. Each of the two auxiliary support plates has a distance of 0.5 mm to the normal de-adhesion drive motor 3. A threaded hole is drilled in each of the two auxiliary support plates. The fastening screw 17 is tightened on each of the two auxiliary support plates on different sides of the normal de-adhesion drive motor 3 until the fastening screw 17 contacts the normal de-adhesion drive motor 3. The mounting angle of the motor is adjusted such that the motor can rotate more smoothly. Then, at an intermediate section of the normal de-adhesion drive motor 3, steel wires 4 are used to bind the normal de-adhesion drive motor 3 onto the auxiliary support plates through wire-through holes of the auxiliary support plates. Finally, the steel wires 4 are knotted with an aluminum-made plastic chuck.

Herein, in order to improve the mounting rigidity of the normal de-adhesion drive motor 3 and reduce the vibration of the motor, two auxiliary support plates are disposed on the motor mounting plate 5. To facilitate the mounting and debugging of the motor, the two auxiliary support plates deviate a distance of 0.5 mm from the normal de-adhesion drive motor 3.

In an embodiment of the present invention, the tangential loading transmission mechanism 1 adopts a bevel gear pair, such that the tangential loading transmission mechanism 1 is arranged in a bending manner, and the motor on the tangential loading transmission mechanism 1 is collected inside the assembly.

In an embodiment of the present invention, the worm gear reducer is used to realize a compact structure and apply a greatly increased force to the motor. The tangential loading motor 32 of the tangential loading transmission mechanism 1 drives, through the reducer and the key 28, the cam pull plate 9 to rotate around the central shaft 6 of the adhesion apparatus.

In an embodiment of the present invention, the cam groove 35 having a reasonable contour curve is disposed on the cam pull plate 9. Six transmission bolts 10 on six adhesion units simultaneously perform centripetal driving on the adhesion units with a further increased force, so as to realize tangential and centripetal loading of the adhesion units.

In an embodiment of the present invention, in order to reduce the power consumptions of a high pair between the cam groove 35 and the transmission bolt 10 in a spatial environment with no lubricating oil, a cylindrical pair between the cam pull plate 9 and the central shaft 6 of the adhesion apparatus, a revolute pair between the output rod 13 of the two-stage force increasing mechanism and the cam pull plate 9, and a planar pair between the cam pull plate 9 and a sliding plate of the adhesion unit, with consideration to the strength factor, the cam pull plate 9 is made from aluminum bronze.

In an embodiment of the present invention, in order to improve the anti-vibration performance of the tangential loading motor 32, at the intermediate section of the tangential loading motor 32, steel wires 31 are used to bind the motor on the mounting bottom plate 26, and the steel wires 31 are knotted with the aluminum-made plastic chuck 36.

In an embodiment of the present invention, in order to improve the anti-vibration performance of the tangential loading motor 32, and enable an output shaft of the tangential loading motor 32 to be free from unnecessary loads other than a load torque, have a compact structure and a high reliability and adapt to a high and low temperature alternating vacuum environment in space, in the tangential loading motor 32, a thrust bearing of the driving bevel gear 25 is directly machined on the drive motor support base 19 made from self-lubricating bronze.

In an embodiment of the present invention, the tangential loading motor 32 is directly connected to the driving bevel gear 25 driven thereby, thereby saving a shaft coupling.

In an embodiment of the present invention, in a sliding bearing, the driving bevel gear 25 is circumferentially fixed on a motor shaft of the tangential loading motor 32 through the fastening screw 18. First, outside the sliding bearing, the motor shaft is inserted in an inner hole of the driving bevel gear 25. Then, a thread surface of the fastening screw 18 is coated with a metal bonding adhesive. Next, the fastening screw 18 is screwed in until the fastening screw exactly contacts a motor shaft transmission plane of the tangential loading motor 32, ensuring that the motor shaft can freely get in and out of the inner hole of the driving bevel gear 25. After a setting time of the adhesive, the motor shaft is lightly pulled out from the inner hole of the driving bevel gear 25. Hereafter, in the sliding bearing, the motor shaft can be inserted in the inner hole of the driving bevel gear 25 to reliably transfer a torque.

In an embodiment of the present invention, in order to adjust a transmission clearance of two bevel gears 25 and 29, a position of the drive motor support base 19 mounted with the driving bevel gear 25 can be adjusted on the mounting bottom plate 26. After the position is adjusted, the metal gasket 22 can be cushioned in a gap between the support bases 19 and 23, and the support bases 19 and 23 can be fixed together through the screw 20, so as to ensure the transmission precision and the overall rigidity.

In an embodiment of the present invention, the positioning pin 37 is inserted in the positioning pin 37 hole disposed between the mounting bottom plate 26 and the drive motor support base 19 to prevent the clearance between the bevel gears from enlarging due to the movement of the drive motor support base 19.

In an embodiment of the present invention, the driving bevel gear 25 is axially fixed under the cooperation and limit of the driven bevel gear 29, thereby simplifying the structure and having a reliable performance.

In an embodiment of the present invention, the worm gear 8 only needs to swing a certain angle, and is therefore only machined in the form of an incomplete worm gear.

In an embodiment of the present invention, the driven bevel gear 29 is directly connected to the worm screw 27 through the A-type key 28. When the right hand worm screw 27 is used, in order to enable the worm screw 27 to bear force more reasonably, the worm screw 27 should rotate anticlockwise in a direction of looking at the worm screw 27 from the driven bevel gear 29.

In an embodiment of the present invention, on the basis of a force state of the worm screw 27, the two ends of the worm screw 27 both adopt a graphite-lubricated bronze-based sliding bearing 38, thereby having a compact structure and a relatively high reliability, and adapting to the high and low temperature alternating vacuum environment in space.

In an embodiment of the present invention, in order to facilitate the adjustment of the degrees of tightness of the sliding bearings at the two ends of the worm screw 27, three long screws 21 are used to axially connect the two worm screw bearing support bases 23 and 24 along the worm screw 27.

In an embodiment of the present invention, in order to improve the reliability of a threaded connection of a worm screw assembly, a through hole in one worm screw bearing support base 24 is a threaded hole. After the degrees of tightness of the sliding bearings at the two ends of the worm screw 27 are debugged well, a nut is screwed at an end of each of three connection screws 21, and then the metal bonding adhesive is coated to form a double anti-loose structure: local force closed loop anti-loose and permanent anti-loose.

In an embodiment of the present invention, after the positions of the worm gear 8 and the worm screw 27 and the clearance therebetween are debugged well, the worm screw assembly is fixed to the mounting bottom plate 26 through a screw, and then cylindrical pin holes are machined on the worm screw 27 bearing support bases 23, 24 and the mounting bottom plate 26.

In an embodiment of the present invention, the cylindrical pin 37 with an internal thread is used to position the worm screw assembly on the mounting bottom plate 26, so as to ensure the transmission precision of the worm screw.

In an embodiment of the present invention, the guide shaft 30 and the bushing 39 cooperate to circumferentially limit the worm screw assembly on a tangential loading and unloading transmission mechanism and the drive motor 32 thereof. Meanwhile, the latter is allowed to move along the axis of the central shaft 6 of the apparatus together with the cam pull plate 9 which is also located on the normal de-adhesion transmission mechanism 2.

In an embodiment of the present invention, in order to prevent the connection screw 12 from interfering the rotation of the cam pull plate 9 during tangential loading and unloading (where the connection screw, during de-adhesion motion, penetrates through the cam pull plate 9, and limits the worm screw assembly and the mounting bottom plate 26 of the drive motor together with the cam pull plate 9 in the axial direction of the central shaft 6 of the apparatus), the circular arc through hole 11 having a radial distance to the connection screw 12 is disposed on the cam pull plate 9. A central angle of the circular arc through hole 11 is greater than a rotation angle of the cam pull plate 9 during tangential loading and unloading.

In an embodiment of the present invention, centripetal loading and unloading motions for de-adhering, backward bending and decoupling the adhesion units can be realized at any de-adhesion and backward bending positions of the adhesion unit.

In an embodiment of the present invention, in order to prevent the two motions from interfering with each other, four combined motions can be designed.

The objective of the present invention is to provide a transmission apparatus for a spatial adhesion apparatus adopting a dry adhesive material, and the transmission apparatus adapts to a complex space and a harsh environment, has a compact structure and high reliability, and is free to decouple. A two-degree-of-freedom decoupled transmission apparatus for a spatial adhesion pawl includes the tangential loading transmission mechanism 1 and the normal de-adhesion transmission mechanism 2.

The tangential loading transmission mechanism 1 can realize centripetal loading and centrifugal unloading transmission functions. The tangential loading transmission mechanism 1 adopts a bevel gear pair, such that the tangential loading transmission mechanism 1 is arranged in a bending manner, and the motor of the tangential loading transmission mechanism 1 is collected inside the apparatus, thereby enabling the structure to be more compact. The tangential loading motor 32 is connected to the cam pull plate 9 through the bevel gear pair, the worm gear reducer and the key 28, and drives the cam pull plate 9 to rotate around the central shaft 6 of the adhesion apparatus. Then, six transmission bolts 10 on six adhesion units are respectively driven through six cam grooves having a reasonable contour curve on the cam pull plate 9 to simultaneously perform centripetal driving on the adhesion units with a further increased force, so as to realize tangential and centripetal loading of the adhesion units.

The normal de-adhesion transmission mechanism 2 adopts a two-stage force increasing mechanism consisting of the trapezoidal lead screw 14 and two four-rod force increasing mechanisms which are symmetrically arranged and both located at a dead point position during reverse loading. The two-stage force increasing mechanism is suspended at the middle of the four-rod force increasing mechanism through two hinges at across corners of the four-rod force increasing mechanism. The output rod 13 of the two-stage force increasing mechanism pulls a combination in the apparatus in the axial direction of the central shaft 6 of the adhesion apparatus, drives the cam pull plate 9 thereon to simultaneously pull the six transmission bolts 10, and finally drives the six adhesion units to simultaneously de-adhere and bend backward or do a return motion.

The guide shaft 30 and the bushing cooperate to circumferentially limit the worm screw assembly on a tangential loading and unloading transmission mechanism and the drive motor thereof. Meanwhile, the latter is allowed to move along the axis of the central shaft 6 of the apparatus together with the cam pull plate 9 which is also located on the normal de-adhesion transmission mechanism 2. In order to prevent the connection screw 12 from interfering the rotation of the cam pull plate 9 during tangential loading and unloading (where the connection screw, during de-adhesion motion, penetrates through the cam pull plate 9, and limits the worm screw assembly and the mounting bottom plate 26 of the drive motor together with the cam pull plate 9 in the axial direction of the central shaft 6 of the apparatus), the circular arc through hole 11 having a radial distance to the connection screw 12 is disposed on the cam pull plate 9. A central angle of the circular arc through hole 11 is greater than a rotation angle of the cam pull plate 9 during tangential loading and unloading. Therefore, centripetal loading and unloading motions for de-adhering, backward bending and decoupling the adhesion units can be realized at any de-adhesion and backward bending positions of the adhesion unit. Centripetal loading and unloading motions of the adhesion units and the de-adhesion, bending backward, and return motions of the adhesion units form four combined motions, thereby facilitating the design of a control system. To be specific, 1. The Normal De-Adhesion Transmission Mechanism 2

The normal de-adhesion transmission mechanism 2 adopts a two-stage force increasing mechanism to load a de-adhesive force, and the two-stage force increasing mechanism consists of the trapezoidal lead screw 14 and two four-rod force increasing mechanisms which are symmetrically arranged and both located at a dead point position during reverse loading. The normal de-adhesion transmission mechanism not only has a compact structure and a great output force, but also greatly reduces a structurally imbalanced force and structural vibration owing to the symmetric structure. Furthermore, the trapezoidal lead screw 14 is a self-locking trapezoidal lead screw 14, and is located at a dead point position during the reverse loading of the four-rod force increasing mechanism. Therefore, the normal de-adhesion transmission mechanism 2 remains the state unchanged owing to the two-stage self-locking when an end is under impact. The trapezoidal lead screw force increasing mechanism is suspended at the middle of the four-rod force increasing mechanism through two hinges at across corners of the four-rod force increasing mechanism, thereby saving the mounting space, having a compact structure, and satisfying a requirement for movement space during loading.

The output rod 13 of the force increasing mechanism is located between the worm gear 8 and the cam pull plate 9, and the thin nut 7 at an end of the cam pull plate 9 is used to limit the relative movement of the three in a common axial direction thereof. In order to prevent the thin nut 7 from loosening during a task and enable the structure to be compact, the thin nut 7 is firmly adhered to an external thread at the end of the cam pull plate 9 through a thread bonding agent. The output rod 13 of the force increasing mechanism is sleeved on a shaft neck of the cam pull plate 9 in a clearance (which is large) fit manner, such that the two can freely and relatively rotate. The worm gear 8 is circumferentially and fixedly connected to the cam pull plate 9 through the A-type key 28 on a shaft neck at a proximal end of the cam pull plate 9. The output rod 13 of the force increasing mechanism, the worm gear 8 and the cam pull plate 9 form a triplet, and are cylindrically fitted through a central hole of the cam pull plate 9 and the central shaft 6 of an adhesion apparatus. The former can move along and rotate around an axis of the latter. The output rod 13 of the force increasing mechanism pulls the combination in the axial direction of the central shaft 6 of the adhesion apparatus, drives the cam pull plate 9 thereon to simultaneously pull the six transmission bolts 16 for hinge holes, and finally drives the adhesion units to simultaneously de-adhere or do a return motion.

The normal de-adhesion drive motor 3 needs a rotating speed of 1 r/s only during de-adhesion, and thus can be directly connected to the trapezoidal lead screw 14 driven thereby, thereby saving a shaft coupling. However, saving the shaft coupling enables a shaft connection to be rigid, and a little deviation during machining and assembly can cause the motor to rotate un-smoothly or vibrate. In order to solve the problem and facilitate the assemble of the normal de-adhesion drive motor 3 when the machining precision of the component is general, the trapezoidal lead screw 14 is first assembled; then the position of the normal de-adhesion drive motor 3 is adjusted; and the mounting hole of the normal de-adhesion drive motor 3 is enlarged by 0.5 mm. In order to improve the mounting rigidity of the normal de-adhesion drive motor 3 and reduce the vibration of the normal de-adhesion drive motor 3, two auxiliary support plates 5 are disposed on the mounting plate of the normal de-adhesion drive motor 3. To facilitate the mounting and debugging of the normal de-adhesion drive motor 3, the two auxiliary support plates 5 deviate a distance of 0.5 mm from the normal de-adhesion drive motor 3. A a threaded hole is drilled in each of the two auxiliary support plates 5. The fastening screw 17 is tightened on each of the two auxiliary support plates 5 on different sides of the normal de-adhesion drive motor 3 until the fastening screw contacts the normal de-adhesion drive motor 3. The mounting angle of the normal de-adhesion drive motor 3 is adjusted such that the normal de-adhesion drive motor 3 can rotate more smoothly. Then, at an intermediate section of the normal de-adhesion drive motor 3, steel wires 4 are used to bind the normal de-adhesion drive motor 3 onto the auxiliary support plates 5 through wire-through holes of the auxiliary support plates 5. Finally, the steel wires 4 are knotted with an aluminum-made plastic chuck.

2. The Tangential Loading Transmission Mechanism 1

The tangential loading transmission mechanism 1 adopts a bevel gear, such that the tangential loading transmission mechanism 1 is arranged in a bending manner, and the tangential loading motor 32 of the tangential loading transmission mechanism 1 is collected inside the assembly. The worm gear reducer is used to realize a compact structure and apply a greatly increased force to the tangential loading motor 32. The tangential loading motor 32 drives, through the reducer and the key 28, the cam pull plate 9 to rotate around the central shaft 6 of the adhesion apparatus. Afterwards, the cam groove having a reasonable contour curve is disposed on the cam pull plate 9. Six transmission bolts 10 on six adhesion units simultaneously perform centripetal driving on the adhesion units with a further increased force, so as to realize tangential and centripetal loading of the adhesion units.

In order to reduce the power consumptions of a high pair between the cam groove and the transmission bolt 10 in a spatial environment with no lubricating oil, a cylindrical pair between the cam pull plate 9 and the central shaft 6 of the adhesion apparatus, a revolute pair between the output rod 13 of the force increasing mechanism and the cam pull plate 9, and a planar pair between the cam pull plate 9 and a sliding plate of the adhesion unit, with consideration to the strength factor, the cam pull plate 9 is made from aluminum bronze.

In order to improve the anti-vibration performance of the tangential loading motor 32, at the intermediate section of the tangential loading motor 32, steel wires 31 are used to bind the tangential loading motor 32 on the fixing bottom plate of the tangential loading motor 32, and the steel wires 31 are knotted with the aluminum-made plastic chuck 36. In order to enable the output shaft of the tangential loading motor 32 to be free from unnecessary loads other than a load torque, a thrust bearing is required to support the driving bevel gear 25. Further, in order to enable the structure to be compact and improve the reliability, the bearing adopts a sliding bearing. Moreover, in order to adapt to the high and low temperature alternating vacuum environment in space, the bearing is made from self-lubricating bronze. Finally, in order to enable the structure to be compact and improve the reliability, the thrust bearing of the driving bevel gear 25 is directly machined on the drive motor support base 19 made from self-lubricating bronze. Since the rotating speed required for the tangential loading motor 32 during de-adhesion and unloading is less than 4 r/s, the tangential loading motor can be directly connected to the driving bevel gear 25 driven thereby, thereby saving a shaft coupling. In order to enable the structure to be compact, in the sliding bearing, the driving bevel gear 25 is circumferentially fixed on the motor shaft through the fastening screw 18. In order to solve the problem of circumferentially fixing the driving bevel gear 25 through the fastening screw 18 and reduce the manufacturing cost, a simple and reliable method in addition to electrical discharge terrace die machining can be used. First, outside the sliding bearing on the support base 19 of the tangential loading motor 32, the shaft of the tangential loading motor 32 is inserted in an inner hole of the driving bevel gear 25. Then, a thread surface of the fastening screw 18 is coated with a metal bonding adhesive. Next, the fastening screw 18 is screwed in until the fastening screw exactly contacts a motor shaft transmission plane, ensuring that the motor shaft can freely get in and out of the inner hole of the driving bevel gear 25. After a setting time of the adhesive, the motor shaft is lightly pulled out from the inner hole of the driving bevel gear 25. Hereafter, in the sliding bearing, the motor shaft can be inserted in the inner hole of the driving bevel gear 25 to reliably transfer a torque.

In order to adjust a transmission clearance of two bevel gears, a position of the drive motor support base 19 mounted with the driving bevel gear 25 can be adjusted on the mounting bottom plate 26. After the position is adjusted, the metal gasket 22 can be cushioned in a gap between the support bases 19 and 23, and the support bases 19 and 23 can be fixed together through the screw 20, so as to ensure the transmission precision and the overall rigidity. The driving bevel gear 25 is axially fixed under the cooperation and limit of the driven bevel gear 29, thereby simplifying the structure and having a reliable performance. The worm gear 8 only needs to swing a certain angle, and is therefore only machined in the form of the incomplete worm gear 8.

The driven bevel gear 29 is directly connected to the worm screw 27 through the A-type key 28. Since tangential centripetal loading requires a greater driving force than tangential centrifugal unloading, a reaction force of the worm gear 8 that the worm screw 27 bears in the axial direction of the worm screw 27 during centripetal loading is greater than that during centrifugal unloading. The driven bevel gear 29 always bears a force pointing to the worm screw 27 in the axial direction of the driven bevel gear 29, therefore, in order to enable the worm screw 27 to bear force more reasonably, in case of using a common right hand worm screw, the worm screw 27 should rotate anticlockwise in a direction of looking at the worm screw 27 from the driven bevel gear. On the basis of a force state of the worm screw 27, the two ends of the worm screw 27 both adopt a graphite-lubricated bronze-based sliding bearing 38, thereby having a compact structure and a relatively high reliability, and adapting to the high and low temperature alternating vacuum environment in space. In order to facilitate the adjustment of the degrees of tightness of the sliding bearings 38 at the two ends of the worm screw 27, three long screws 21 are used to axially connect the two worm screw 27 bearing support bases 23 and 24 along the worm screw 27. The worm screw assembly is a weak link of the tangential loading transmission mechanism 1. In order to improve the reliability of a threaded connection, a through hole in one worm screw bearing support base 24 is a threaded hole. After the degrees of tightness of the sliding bearings at the two ends of the worm screw 27 are debugged well, a nut is screwed at an end of each of three connection screws 21, and then the metal bonding adhesive is coated to form a double anti-loose structure: local force closed loop anti-loose and permanent anti-loose. After the positions of the worm gear 8 and the worm screw 27 and the clearance therebetween are debugged well, the worm screw assembly is fixed to the mounting bottom plate 26 through a screw, and then pin holes are machined on the worm screw 27 bearing support bases 23, 24 and the mounting bottom plate 26. A cylindrical pin with an internal thread is used to position the worm screw assembly on the mounting bottom plate 26, so as to prevent the worm screw assembly from generating a small displacement along the mounting bottom plate 26 in a thread-fastening radial clearance range, and ensure the transmission precision of the worm screw.

3. Decoupling Design of Two Transmission Chains

When the worm screw 27 drives the worm gear 8, the worm screw assembly and the drive motor 32 thereof cannot move along the circumference of the worm gear 8; furthermore, the tangential loading transmission mechanism 1 can move along the axis of the central shaft 6 of the apparatus together with the cam pull plate 9 which is a common component on the normal de-adhesion transmission mechanism 2 and the tangential loading transmission mechanism 1, so as to realize the centripetal loading and unloading motions for de-adhering, backward bending and decoupling the adhesion units at any de-adhesion and backward bending positions of the adhesion unit. To satisfy the requirement, the guide shaft 30 and the graphite-lubricated bronze bushing 39 cooperate to circumferentially limit the tangential loading transmission mechanism 1. In this way, the tangential loading transmission mechanism 1 can also move along the axis of the central shaft 6 of the apparatus together with the cam pull plate 9 on the normal de-adhesion transmission mechanism 2. The two motions do not interfere with each other, and can form four combined motions. In order to prevent the connection screw 12 from interfering the rotation of the cam pull plate 9 during tangential and centripetal loading (where the connection screw penetrates through the cam pull plate 9, and limits the worm screw assembly and the mounting bottom plate 26 of the drive motor together with the cam pull plate 9 in the axial direction of the worm gear 8), the circular arc through hole 11 is disposed at a radial position at which the connection screw 12 on the cam pull plate 9 is located.

The embodiments in the specification are described in a progressive manner, and each embodiment emphasizes on the differences from other embodiments. The same or similar parts between the embodiments can refer to each other.

It is apparent that a person skilled in the art can make various modifications and variations to the present invention without departing from the spirit and scope of the present invention. If these modifications and variations of the present invention fall within the scope of the claim of the present invention and equivalent technology thereof, the present invention is intended to include these modifications and variations.

Figure 4:
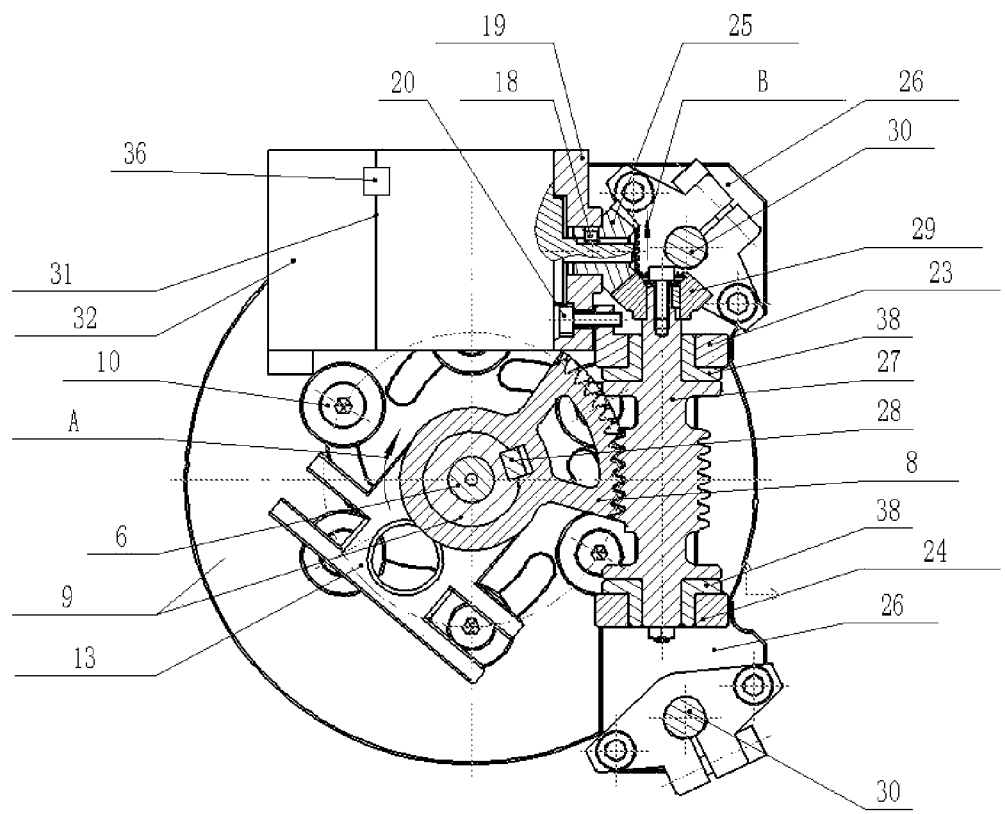
FIG. 4 is an overall view of a loading transmission chain according to an embodiment of the present invention.
Figure 5:
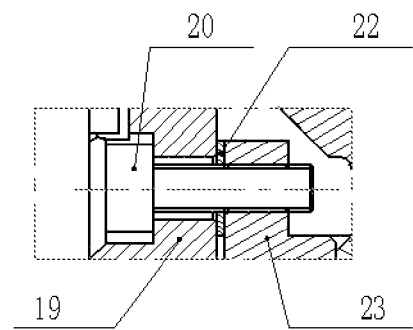
FIG. 5 is a local enlarged view of a gear gap adjustment structure according to an embodiment of the present invention.
Figure 6:
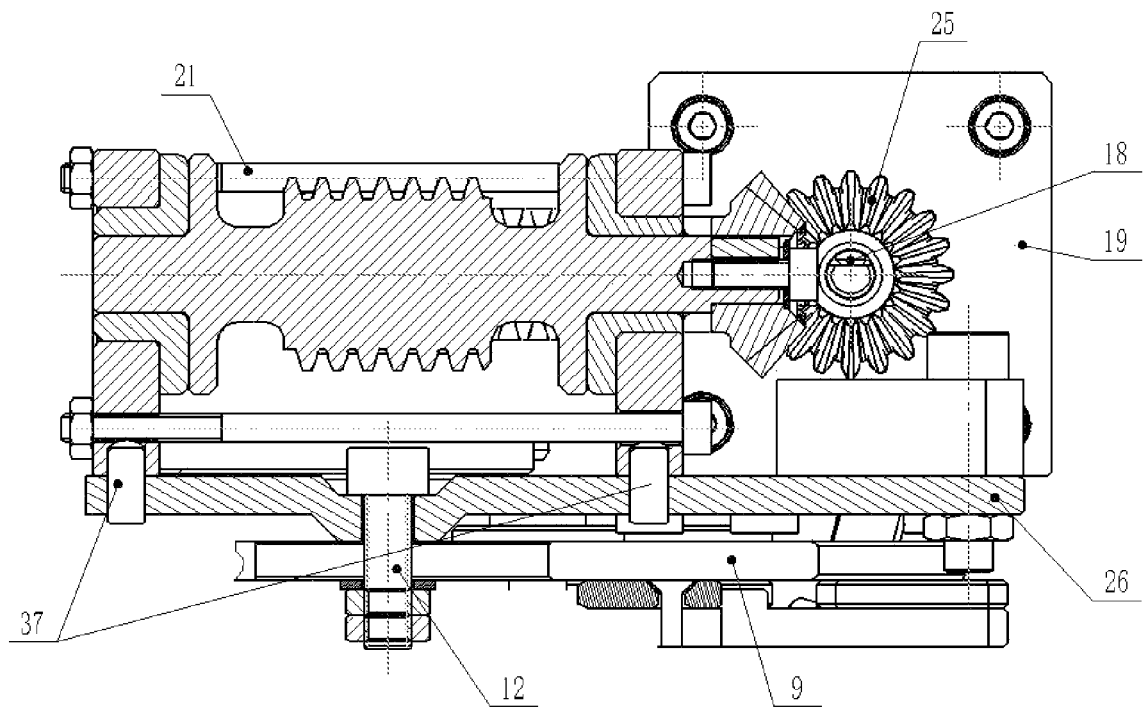
FIG. 6 is a location view of a decoupling worm screw assembly according to an embodiment of the present invention.
Figure 7:
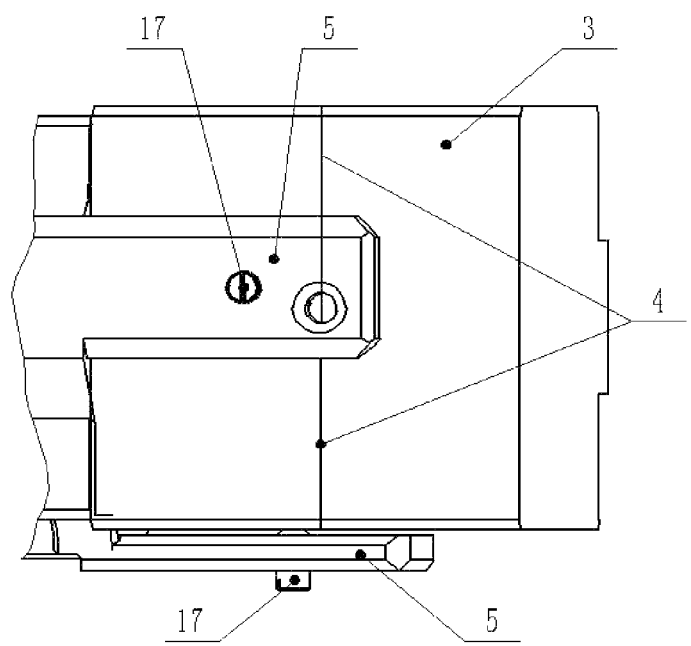
FIG. 7 is a fixation view of a normal de-adhesion drive motor according to an embodiment of the present invention.

What is claimed is:

1. A two-degree-of-freedom decoupled transmission apparatus for a spatial adhesion pawl, comprising a tangential loading transmission mechanism and a normal de-adhesion transmission mechanism, wherein the tangential loading transmission mechanism is used to realize centripetal loading and centrifugal unloading transmission functions;

the tangential loading transmission mechanism adopts a bevel gear pair, the tangential loading transmission mechanism is arranged in a bending manner, and a tangential loading motor of the tangential loading transmission mechanism is collected inside the two-degree-of-freedom decoupled transmission apparatus;

the tangential loading motor of the tangential loading transmission mechanism rotates in an arrow direction B as shown in FIG. 4;

a cam pull plate is driven by the bevel gear pair, a worm gear reducer and a key to rotate around a central shaft of an adhesion apparatus in an arrow direction A as shown in FIG. 4;

six transmission bolts on six adhesion units are respectively driven through six cam grooves on the cam pull plate to simultaneously perform centripetal driving on the six adhesion units with a further increased force to realize tangential and centripetal loading of the six adhesion units;

the normal de-adhesion transmission mechanism adopts a two-stage force increasing mechanism consisting of a trapezoidal lead screw and a four-rod force increasing mechanism, wherein the four-rod force increasing mechanism is symmetrical and located at a dead point position during reverse loading;

the lead screw is suspended at a middle of the four-rod force increasing mechanism through two hinges at across corners of the four-rod force increasing mechanism; and an output rod of the two-stage force increasing mechanism pulls a combination in the two-degree-of-freedom decoupled transmission apparatus in an axial direction of the central shaft of the adhesion apparatus, drives the cam pull plate on the output rod of the two-stage force increasing mechanism to pull the six transmission bolts, and finally drives the six adhesion units to simultaneously de-adhere and bend backward or do a return motion.

2. The two-degree-of-freedom decoupled transmission apparatus for the spatial adhesion pawl according to claim 1, wherein the output rod of the two-stage force increasing mechanism is located between a worm gear and the cam pull plate;

the output rod of the two-stage force increasing mechanism, the worm gear and the cam pull plate form a triplet, and are cylindrically connected through a central hole of the cam pull plate and the central shaft of the adhesion apparatus; and the cam pull plate moves along and rotates around an axis of the central shaft of the adhesion apparatus.

3. The two-degree-of-freedom decoupled transmission apparatus for the spatial adhesion pawl according to claim 2, further comprising a nut disposed at an end of the cam pull plate; wherein the nut at the end of the cam pull plate is used to limit a relative movement of the triplet in a common axial direction of the triplet; and the nut is firmly adhered to an external thread at the end of the cam pull plate through a thread bonding agent.

4. The two-degree-of-freedom decoupled transmission apparatus for the spatial adhesion pawl according to claim 2, wherein the output rod of the two-stage force increasing mechanism is sleeved on a shaft neck of the cam pull plate in a clearance fit manner, and the output rod of the two-stage force increasing mechanism and the cam pull plate rotate freely and relatively.

5. The two-degree-of-freedom decoupled transmission apparatus for the spatial adhesion pawl according to claim 2, wherein the worm gear is circumferentially and fixedly connected to the cam pull plate through a key at a proximal end of a shaft neck of the cam pull plate.

6. The two-degree-of-freedom decoupled transmission apparatus for the spatial adhesion pawl according to claim 2, wherein two auxiliary support plates are disposed on a mounting plate of a normal de-adhesion drive motor;

each of the two auxiliary support plates has a distance of 0.5 mm to the normal de-adhesion drive motor;

a threaded hole is drilled in each of the two auxiliary support plates;

a fastening screw is tightened on each of the two auxiliary support plates on different sides of the normal de-adhesion drive motor until the fastening screw contacts the normal de-adhesion drive motor;

at an intermediate section of the normal de-adhesion drive motor, steel wires are used to bind the normal de-adhesion drive motor onto the two auxiliary support plates through wire-through holes of the two auxiliary support plates;

the steel wires are knotted with an aluminum-made plastic chuck; and the tangential loading transmission mechanism comprises the tangential loading motor.

7. The two-degree-of-freedom decoupled transmission apparatus for the spatial adhesion pawl according to claim 2, wherein the cam pull plate is made from aluminum bronze.

8. The two-degree-of-freedom decoupled transmission apparatus for the spatial adhesion pawl according to claim 2, wherein a circular arc through hole having a radial distance to a connection screw is disposed on the cam pull plate; and a central angle of the circular arc through hole is greater than a rotation angle of the cam pull plate during tangential loading and unloading.

9. The two-degree-of-freedom decoupled transmission apparatus for the spatial adhesion pawl according to claim 1, wherein at an intermediate section of the tangential loading motor, steel wires are used to bind the tangential loading motor on a mounting bottom plate, and the steel wires are knotted with an aluminum-made plastic chuck.

10. The two-degree-of-freedom decoupled transmission apparatus for a spatial adhesion pawl according to claim 1, wherein the worm gear is in a form of an incomplete worm gear.

11. The two-degree-of-freedom decoupled transmission apparatus for the spatial adhesion pawl according to claim 1, wherein a guide shaft and a bushing cooperate to circumferentially limit a worm screw assembly on a tangential loading and unloading transmission mechanism and a drive motor of the tangential loading and unloading transmission mechanism;

the worm screw assembly and the drive motor are allowed to move along an axis of the central shaft of the adhesion apparatus together with the cam pull plate, wherein the cam pull plate is located on the normal de-adhesion transmission mechanism.

12. The two-degree-of-freedom decoupled transmission apparatus for the spatial adhesion pawl according to claim 1, wherein the two-degree-of-freedom decoupled transmission apparatus for the spatial adhesion pawl realizes centripetal loading and unloading motions for de-adhering, backward bending and decoupling the six adhesion units at any de-adhesion and backward bending positions of the six adhesion units.

13. The two-degree-of-freedom decoupled transmission apparatus for the spatial adhesion pawl according to claim 1, wherein centripetal loading and unloading motions of the six adhesion units and de-adhesion, bending backward, and return motions of the six adhesion units form four combined motions.

* * * * *